United States Patent Office 3,202,362
Patented Aug. 24, 1965

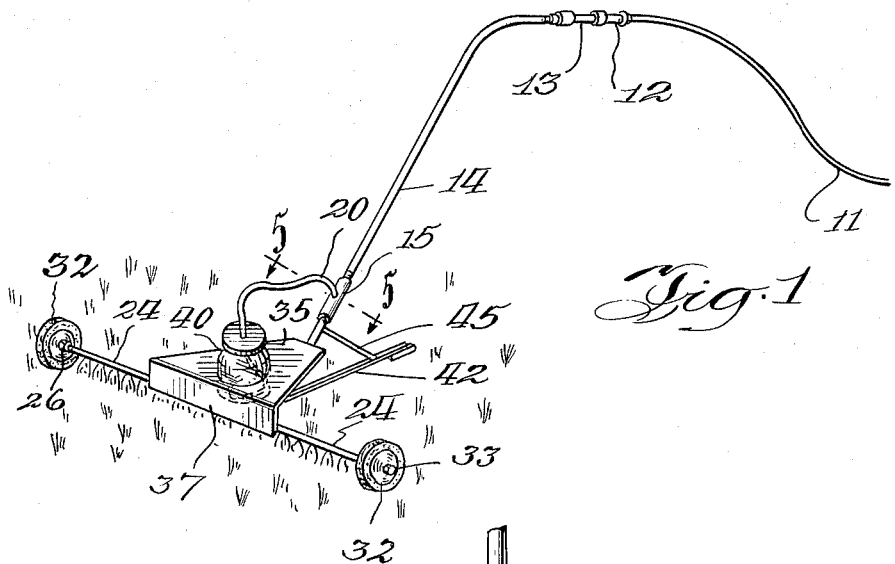
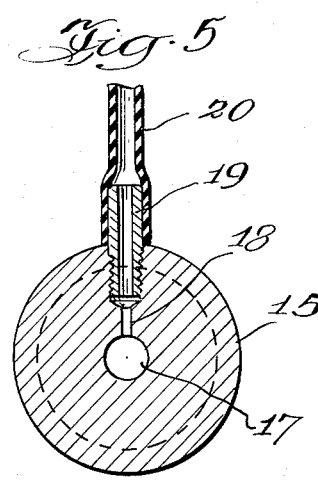
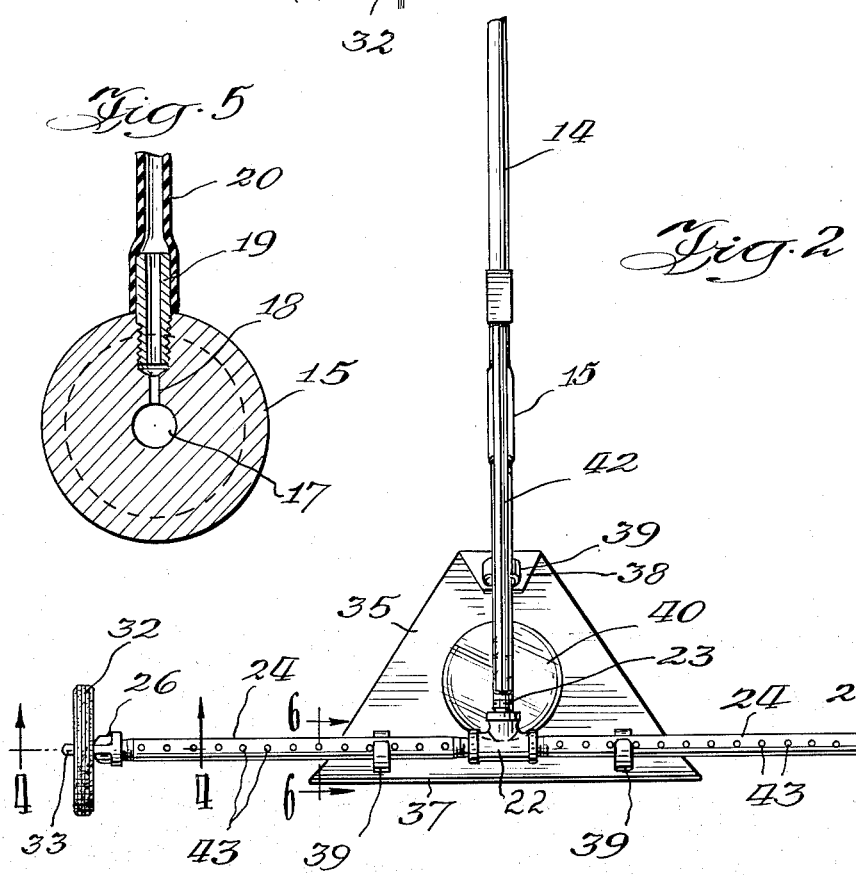

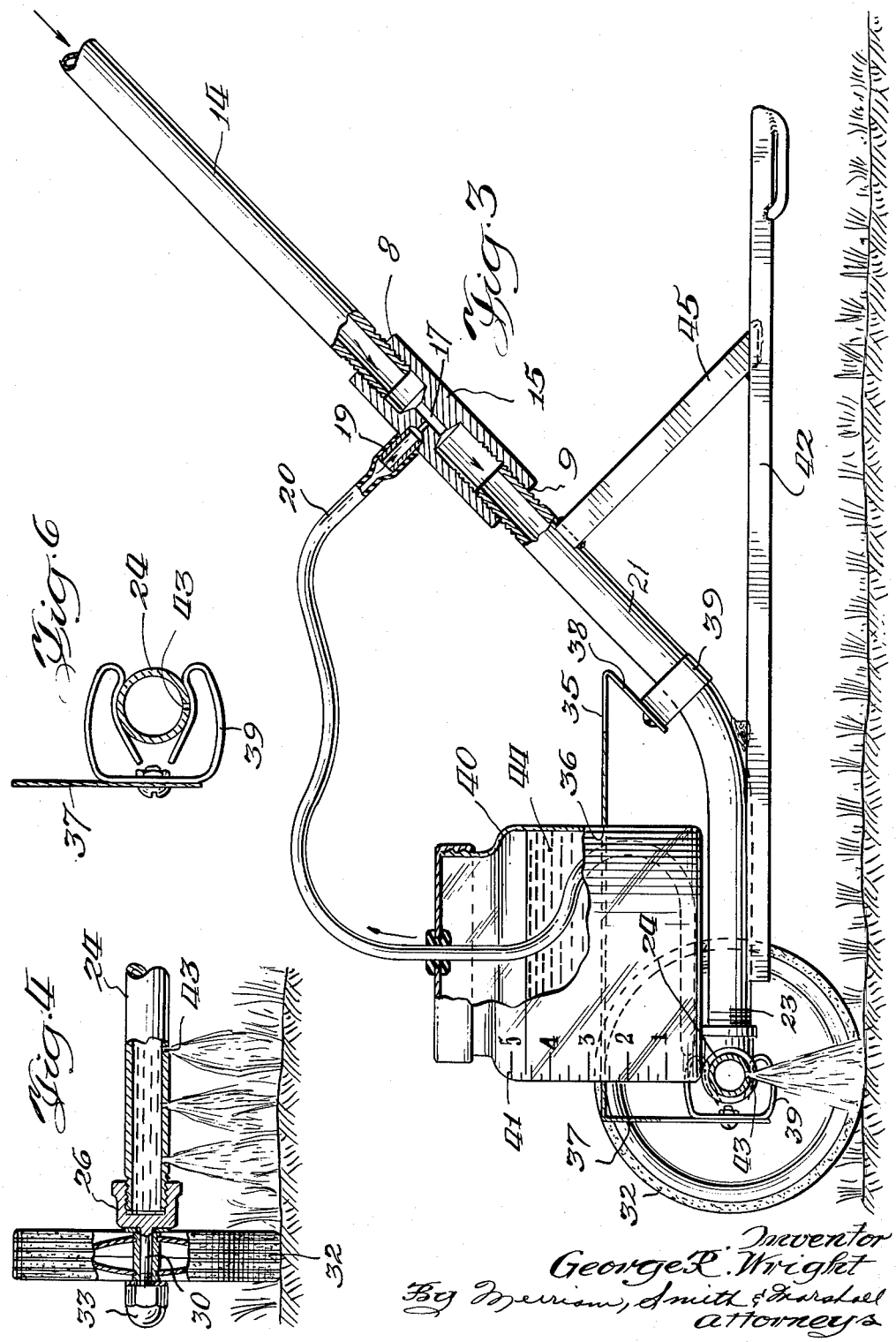

3,202,362
SOLUTION DISPENSING ASSEMBLY
George R. Wright, 1140 Pam-Anne Drive, Glenview, Ill.
Filed Oct. 16, 1963, Ser. No. 316,556
6 Claims. (Cl. 239—287)

This invention relates generally to a solution dispensing assembly. More particularly, this invention relates to an improved assembly for dispensing a solution of liquid concentrate mixed with a supply of water.

Although this invention is primarily used for dispensing of liquid lawn fertilizer and will be discussed as used in this environment, it is appreciated that it may be used for other purposes and is not intended to be limited to this particular use.

In dispensing liquid fertilizers for lawns, a conventional method has been to attach a container having a liquid concentrate therein to a lawn or garden hose. Actuation of the hose water valve permits water to flow through the assembly where, via aspiration, concentrate is withdrawn from the container and is mixed with water. The solution is then sprayed on an area to be fertilized.

Unfortunately, conventional containers have several undesirable characteristics. Initially, the person operating the hose is required to carry the concentrate filled container. Although this presents no problem with spraying small areas, it causes a great deal of fatigue to the operator when he is required to hold the additional weight of this container along with the hose itself in dispensing a solution over large areas. Moreover, it has been found that the average individual in the course of sweeping the liquid fertilizer over the surface to be fertilized fails to achieve a uniform surface distribution of the spray solution. As a result, grass growth is overabundant in some areas and sparse in others.

In order to eliminate these deficiencies, I have invented a dispensing assembly, the operation of which causes a minimum of operator fatigue in addition to providing a uniform distribution of the fertilizer solution. I have provided a rotating dispensing assembly easily adapted for use with a lawn or garden hose. Upon actuation of a water valve, water proceeds at a constant flow through a water inlet member where it mixes with a liquid concentrate which is drawn into the water stream at a predetermined rate via aspiration. Thereafter, the solution is emitted through perforations in a dispensing tube and sprayed on the surface to be fertilized.

Other features and inventions are inherent in the structure claimed and disclosed, as will be apparent to those skilled in the art from the following detailed description in conjunction with the accompanying drawings wherein:

FIGURE 1 shows a prospective view of the liquid concentrate dispenser assembly;

FIGURE 2 shows a sectional view through line 2—2 of the assembly in FIGURE 1;

FIGURE 3 shows a fragmentary side view of the dispenser assembly;

FIGURE 4 shows a sectional view through line 4—4 in FIGURE 2;

FIGURE 5 shows a sectional view through line 5—5 in FIGURE 1; and

FIGURE 6 shows a sectional view through line 6—6 in FIGURE 2.

In FIGURE 1, dispenser assembly is attached to lawn or garden hose 11. Hose 11 is attached in a conventional manner to the assembly at the inlet side of restrictor 12. Restrictor 12 is provided to insure a constant flow of water into the assembly. On the outlet side of restrictor 12 is an "on-off" slide valve 13 which permits the flow of water to the assembly during a spraying operation. It is appreciated that if desired, the position of valve 13 and restrictor 12 can be interchanged in assembly. Valve 13 is connected to a threaded end of tubular member 14 a portion of which is substantially angularly disposed from a plane parallel with the ground surface. The remaining end of member 14 is also threaded and sleeve member 15 is secured to this end by a threaded fastening arrangement. Sleeve member 15 is bored at each of its ends 8, 9 for a substantial length along the sleeve member. Intermediate bored portions 8, 9 of the sleeve member 15, a small hole 17 is made along the longitudinal axis of sleeve member 15 connecting bored portions 8, 9. The diameter of the bored portions is substantially greater than the diameter of hole 17. At right angles to hole 17 a second hole 18 is drilled to intersect hole 17, and connector 19, consisting of a short length of a tubular section, is axially aligned with liquid concentrate inlet hole 18 and fastened to sleeve member 15 by welding, by a threaded connection or by other suitable means. One end of hose 20 is frictionally positioned on connector 19, or, if desired, may be attached by bonding the hose to connector 19.

The remaining end of sleeve member 15 is connected to tubular member 21. A T 22 is threaded into end 23 of member 21. Extending from the remaining outlets of T 22 at 90° to member 21 are tubular members 24, each of which has a plurality of apertures 43 therein. Caps 26 are threadedly engaged with the remaining ends of members 24, and studs 30 are fastened to caps 26 by any suitable means, e.g. welding, each stud being threaded at its free end. Wheels 32 are positioned on the studs and retained in place by cap nuts 33.

A triangular sheet metal plate 35 having ends 37, 38 angularly bent, is fastened to members 21 and 24 by means of attaching brackets 39. When plate 35 is in a fastened position, the plate is substantially parallel to the ground surface. Inserted within hole 36, which is punched out of plate 35, and frictionally retained therein is liquid concentrate supply container 40 having graduations 41 located thereon. A portion of hose 20 is inserted within container 40.

An angle iron support member 42 is suitably attached, e.g. welding or bolt and nut arrangement, to member 21 and extends from that member outwardly away from members 24. Brace 45 connects member 42 to member 21 to provide a rigid support for assembly.

Although the present embodiment has been shown using conventional tubular members such as 21, 24 and T 22, the assembly could also be made in a number of other ways. For example, assembly could be a unitary construction being molded from plastic or other material which is impervious to the solution being dispensed. Further, the assembly could be made from a number of readily assembled components so that the unit could be easily disassembled for packaging or storage purposes.

In operation, container 40 is filled with liquid concentrate to the level of a particular graduation which indicates the amount of fertilizer solution that will be available when the concentrate is mixed with the incoming water. The ratio of water to concentrate can be changed by a number of means, e.g., by selection of a sleeve member having different diameters of holes 17 and 18. In the embodiment shown in FIGURES 1, 2 and 5, I have provided a flow ratio of 24 parts of water to 1 part of concentrate.

Valve 13 is then moved to an "on" position and water flows at a constant rate through restrictor 12 into assembly. As water proceeds through sleeve member 15, liquid concentrate 44 is withdrawn from container 40 due to an aspirating effect and mixes with the incoming water in sleeve member 15. The solution passes through dispenser member 21 under pressure into members 24 and through perforations 43 on to the surface to be fertilized. Perforations 43 are spaced so that the solution emitted out of each aperture sprays a designated area which slightly overlaps areas sprayed by solution from adjacent apertures 43. While the spraying action occurs, assembly is rolled over the ground surface. Because the ground is used to support a portion of the weight of the liquid concentrate supply means and hose, a person becomes less fatigued during a large spraying operation. Moreover, moving assembly in adjacent straight paths over the surface to be fertilized will permit uniform distribution of the solution over that area sprayed.

The foregoing detailed description has been given for clearness of understanding only, and no unnecessary limitations should be understood therefrom, as modifications will be obvious to those skilled in the art.

What is claimed is:

1. An assembly for dispensing a solution of liquid concentrate and water, said assembly comprising:
    a water inlet tubular member;
    a sleeve member one end of which is connected to one end of said inlet member;
    a first tubular member attached to the remaining end of said sleeve member;
    additional tubular members joined to and angularly disposed to said first tubular member, said additional members having perforations therein;
    a container mounting plate having an opening therein mounted on at least one of said tubular members;
    a solution supply container frictionally maintained within said opening;
    a flexible hose having one end located within said container and the remaining end attached to said sleeve member; and
    a pair of wheels for rolling said assembly across a surface, one of said wheels being attached to one end of a perforated member while the remaining wheel is attached at one end of another of said perforated members.

2. An assembly in accordance with claim 1 wherein said sleeve member has bored portions for a length extending inwardly from each end of said sleeve; an intermediate portion having a first hole located along the longitudinal axis of said intermediate portion and connecting said bores in said bored portions, the diameter of said bores being substantially greater than the diameter of said first hole, said intermediate portion also having a second hole intersecting said first hole at substantially 90°.

3. An assembly in accordance with claim 1 further including:
    a restrictor;
    a valve means for controlling the flow of water into said assembly, the inlet side of said valve means being attached to said restrictor while the outlet end of said valve means is connected to the remaining end of said water inlet member.

4. An assembly in accordance with claim 1 wherein said plate has brackets attached thereto, said brackets being clipped onto said first and additional tubular members.

5. An assembly in accordance with claim 1 further including an angle iron support having one end attached to said first tubular member and extending beneath and outwardly away from said first tubular member and additional members.

6. An assembly for dispensing a solution of liquid concentrate in water, said assembly comprising:
    a restrictor;
    a valve means for controlling the flow of water into said assembly, the inlet said of said valve means being attached to said restrictor;
    a water inlet tubular member having one end connected to the outlet side of said valve means;
    a sleeve member one end of which is connected to the remaining end of asid inlet member, said sleeve member having bored portions for a length extending inwardly from each end of said sleeve; an intermediate portion located between said bored portions, said intermediate portion having a first hole located along the longitudinal axis of said intermediate portion and connecting said bores in said bored portions, the diameter of said bores being substantially greater than the diameter of said first hole, said intermediate portion also having a second hole intersecting said first hole at substantially 90°;
    a first tubular member attached to the remaining end of said sleeve member;
    additional tubular members joined to and positioned at right angles to said first tubular member, said additional members having spaced perforations therein;
    a container mounting plate having an opening therein, said plate having brackets attached thereto, said brackets being clipped onto said first additional tubular members;
    a solution supply container frictionally maintained within said opening;
    a flexible hose having one end located within said container and the remaining end attached to said sleeve member;
    a pair of wheels for rolling said assembly, one of said wheels being attached to one end of a perforated member while the remaining wheel is attached on one end of another of said perforated members; and,
    a support member having one end attached to said first tubular member and extending beneath and outwardly away from said tubular member and additional members.

References Cited by the Examiner

UNITED STATES PATENTS

| | | | |
|---|---|---|---|
| 2,607,622 | 8/52 | Doepke | 239/286 |
| 2,780,493 | 2/57 | McNair et al. | 222—145 X |
| 2,889,994 | 6/59 | French | 239—287 X |
| 3,052,417 | 9/62 | Daniel | 222—145 X |
| 3,064,904 | 11/62 | Roberts | 239—287 |

LOUIS J. DEMBO, *Primary Examiner.*

RAPHAEL M. LUPO, *Examiner.*